United States Patent [19]

Wallis

[11] Patent Number: 5,243,889
[45] Date of Patent: Sep. 14, 1993

[54] TUBE CUT OFF MACHINE

[76] Inventor: Bernard J. Wallis, 2215 Dacosta, Dearborn, Mich. 48128

[21] Appl. No.: 682,725

[22] Filed: Apr. 9, 1991

[51] Int. Cl.[5] .............................................. B23D 25/04
[52] U.S. Cl. ...................................... 83/303; 83/311; 83/318; 83/647.5
[58] Field of Search ................ 83/303, 119, 120, 150, 83/158, 286-293, 310, 311, 318-320, 326, 353, 370, 647.5; 74/600, 837

[56] References Cited

U.S. PATENT DOCUMENTS

| | | | |
|---|---|---|---|
| 2,307,046 | 1/1943 | Johnson et al. | 83/370 |
| 3,082,655 | 3/1963 | Voigt | 83/647.5 |
| 4,261,228 | 4/1981 | Eagan, Sr. | 74/600 |
| 4,437,372 | 3/1984 | Ishigami et al. | 83/320 |
| 4,462,290 | 7/1984 | Wallis | 83/311 |
| 4,542,670 | 9/1985 | Borzym | 83/318 |
| 4,643,063 | 2/1987 | Gobien | 83/311 |
| 4,939,967 | 7/1990 | Wallis | 83/311 |
| 5,063,801 | 11/1991 | Wallis | 83/311 |

*Primary Examiner*—Frank T. Yost
*Assistant Examiner*—Allan M. Schrock
*Attorney, Agent, or Firm*—Barnes, Kisselle, Raisch, Choate, Whittemore & Hulbert

[57] ABSTRACT

A cut-off machine for cutting off predetermined lengths from a moving length of roll form material such as tubing adapted to be positioned downstream from a source comprising a plurality of cut-off assemblies which are reciprocated longitudinally of the moving length of material and operated during the movement to sever plural predetermined lengths. The reciprocating and cutting movements are derived from a differential beam pivot assembly wherein one end of the beam is driven in a linear reciprocating path by a crank and the other end of the beam is connected to reciprocate the cut-off assemblies such that they are driven at a speed corresponding to the speed of the tube at the time the lengths of tubing are cut off. The apparatus can be adjusted to cut tubes of different lengths by moving the pivot point of the differential beam. The apparatus includes a mechanism for selectively disabling the operation of the cut-off assemblies and actuating them to permit greater lengths of tubes to be cut-off.

9 Claims, 16 Drawing Sheets

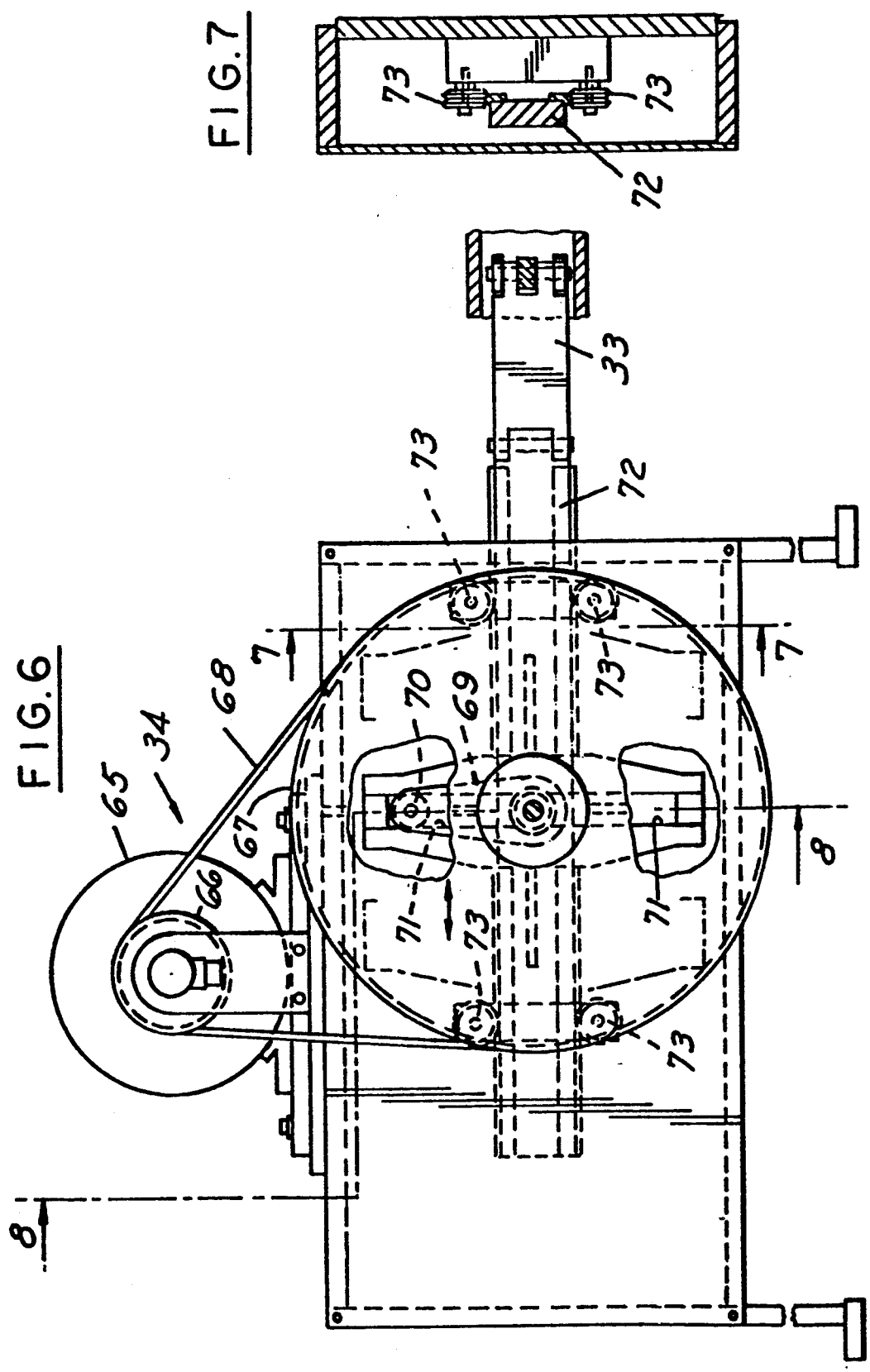

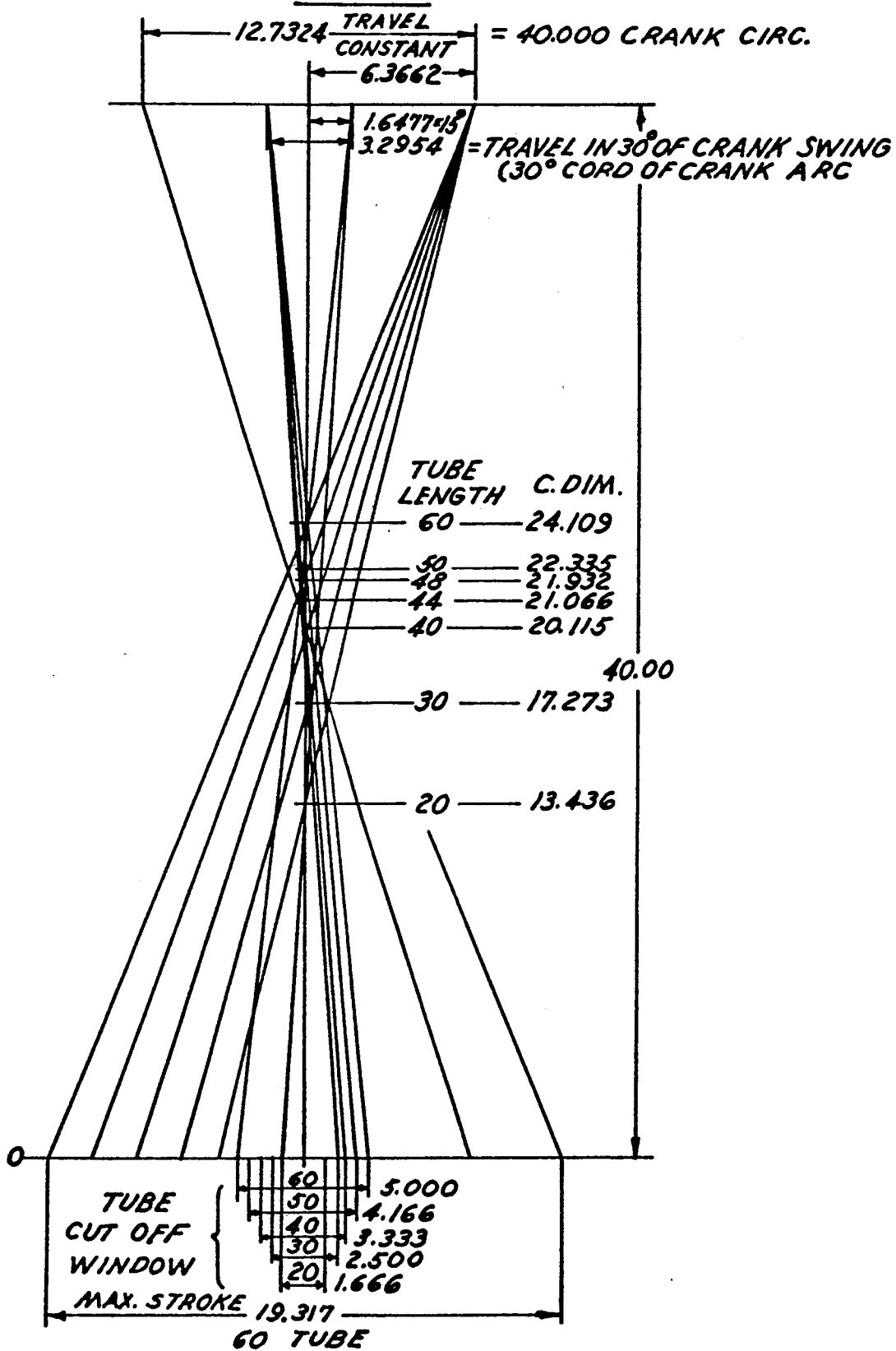

TUBE CUT OFF MACHINE

This invention relates to severing of roll-formed tube stock and the like, and more particularly to an improved machine and method for severing a continuous length of tube stock into individual lengths as the stock moves at high speed in a continuous uninterrupted motion in the direction of its length.

BACKGROUND AND SUMMARY OF THE INVENTION

In manufacture of many products, such as heat exchanger tubes, for example, there is a need for large quantities of tubes cut to very precise lengths with ends accurately perpendicular to the axis of the tube stock. Machines for cutting such tubes to length have been provided heretofore. From the standpoint of economy, it is a practical necessity that such machines be capable of cutting tubes while a continuous length of tube stock is moving in the direction of its length at relatively high speed, preferably as the tubing leaves the last forming stage of a tube mill. Thus, such machines invariably employ a slide of some type on which a cut-off device is mounted and means for moving the slide at the same speed as the tube during the severing operation. Heretofore, complicated and costly devices have been employed for synchronizing the speed of the tubing and the slide on which the cut-off device is mounted. Such synchronizing devices have been not only expensive, but also incapable of functioning accurately when the tube speed is high, for example, in excess of about 175 feet per minute.

In prior art U.S. Pat. No. 4,462,290, a tube cut-off unit is arranged at the downstream end of a tube mill and is powered by a drive unit mechanically driven by the main shaft of the mill that drives the tube forming rolls. The drive unit mechanically rotates a crank which, through a link, reciprocates a slide along the path of travel of the tube. A tube cut-off blade on the slide is cam actuated by motion of the slide along its base to move in a straight line laterally of the tube to sever the tube. The slide moves at a constant speed and at the same speed as the tube when the tube is severed.

In U.S. Pat. No. 4,939,967, the cut-off machine comprises a plurality of cut-off assemblies that are reciprocated on a slide longitudinally of the moving length of tube formed by the mill, and are operated during such movement to sever plural predetermined lengths. The reciprocating and cutting movements are mechanically derived from an electric motor driven in synchronism with the speed of the tubing length. The apparatus includes mechanisms that permit the length of the severed tubes to be changed while the machine is operating. Each cut-off assembly includes a knife blade mounted on a chain for movement in an endless path in a plane perpendicular to the path of the tubing. A portion of the blade path is in a straight line transversely to the axis of movement of the moving length of tubing when the blade intersects the tubing path and severs the tube stock.

Although the cut-off machines disclosed in the noted patents, both by the inventor herein, have addressed and overcome problems theretofore extant in the art, and have enjoyed substantial success, improvements remain desirable. For example, the structure in the prior art patent for synchronizing motion of the knife blade to the tube stock is relatively complex, requiring attention of a trained technician to implement adjustment to accommodate differing stock lengths and/or wear on the moving parts. It is therefore a general object of the present invention to provide a cut-off machine and method that may be implemented in a device having a reduced number of moving parts, that include facility for rapid electronic adjustment for differing parts lengths and/or wear of moving parts, and that include facility for enhanced control of the overall severing operation.

In copending application Ser. No. 07/462,049 filed Jan. 8, 1990, there is described an apparatus wherein a continuous length of material such as tube stock is severed into individual stock lengths in accordance with the present invention by propelling the stock in a continuous uninterrupted motion in the direction of its length along a predefined path. A slide or carriage is continually reciprocated in a direction parallel to the stock path in synchronism with motion of the stock along the path such that velocity of the carriage is equal to velocity of the stock during a portion of each carriage motion cycle. A knife blade is continually rotated on the carriage about an axis parallel to the stock path and in synchronism with motion of the stock along the path such that the knife blade intersects the stock path during the portion of the carriage motion cycle in which carriage velocity equals stock velocity. As the knife blade intersects the path, the knife blade is moved radially inwardly of its axis of rotation, such that the compound result of rotary and radial motion of the knife blade with respect to its axis of rotation moves the knife blade in a straight line tangential to its axis and transverse to the path when the knife blade intersects the stock path and severe the stock.

Such cut-off machines utilize a relatively complex crank mechanism for moving the crank for reciprocating the cut off assemblies as well as an electronic circuit for controlling the servo motor insuring that the speed of movement of the cut off assemblies at cut off is synchronized with the speed of the servo motors, as described in the aforementioned application Ser. No. 07/462,049.

Among the objectives of the present invention are to provide a tube cut off machine which mechanically provides for crank error correction without the need of change in the speed of the drive motor; which can readily provide crank error correction for a range of lengths of tubing; which requires a less complex mechanism resulting in longer life.

In accordance with the invention, a cut-off machine for cutting off predetermined lengths from a moving length of roll form material such as tubing adapted to be positioned downstream from a source such as a tube mill for receiving a moving length from the mill and severing plural predetermined lengths from the moving length. The machine comprises a plurality of cut-off assemblies which are reciprocated longitudinally of the moving length of material formed by the mill and operated during the movement to sever plural predetermined lengths. The reciprocating and cutting movements are derived from a differential beam pivot assembly wherein one end of the beam is driven in a linear reciprocating path by a crank and the other end of the beam is connected to reciprocate the cut-off assemblies such that they are driven at a speed corresponding to the speed of the tube at the time the lengths of tubing are cut off. The apparatus can be adjusted to cut tubes of different lengths by moving the pivot point of the differential beam. The differential beam pivot assembly insures that the cut-off assemblies are moving at the same speed as the length of tubing during cut-off or severing of the predetermined lengths.

In the aforementioned types of apparatus, the cut-off assemblies are operated once during each reciprocating cycle. This thus limits the lengths of tubing to be cut.

Accordingly, among the further objectives of the present invention are to provide an apparatus for selectively disabling the operation of the cutter of each cut-off assembly and operating the cutter after a predetermined number of cycles thereby cutting tubes of greater length.

DESCRIPTION OF THE DRAWINGS

FIG. 6 is a sectional view taken along the line 6—6 in FIG. 1.

FIG. 7 is a sectional view taken along the line 7—7 in FIG. 6.

FIG. 10 is a diagram of the adjustment of the differential beam mechanism to accommodate the cut-off tubes at different lengths.

DESCRIPTION

Figure 1:
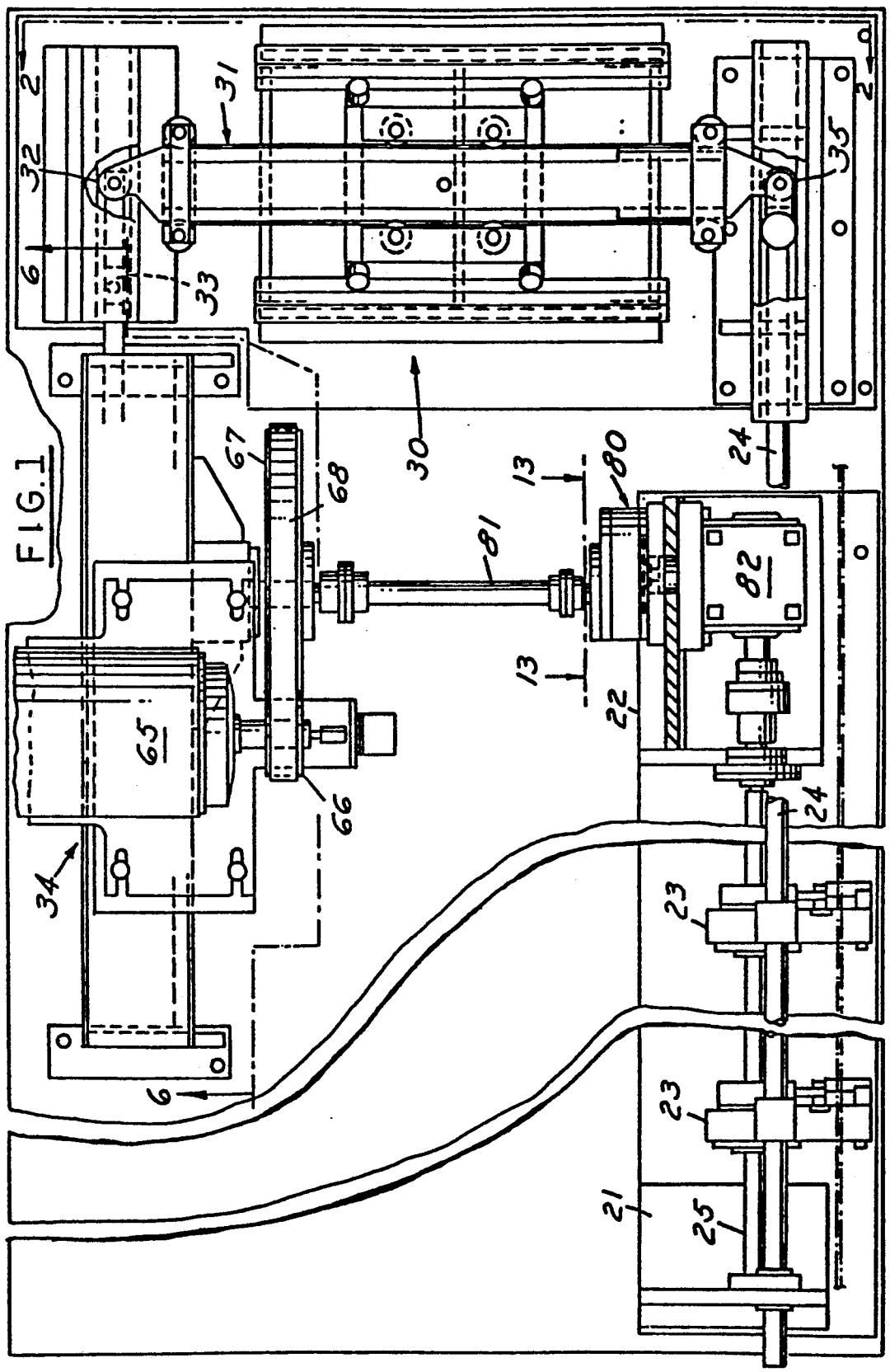
FIG. 1 is a fragmentary plan view of a cut-off machine embodying the invention.
Figure 2:
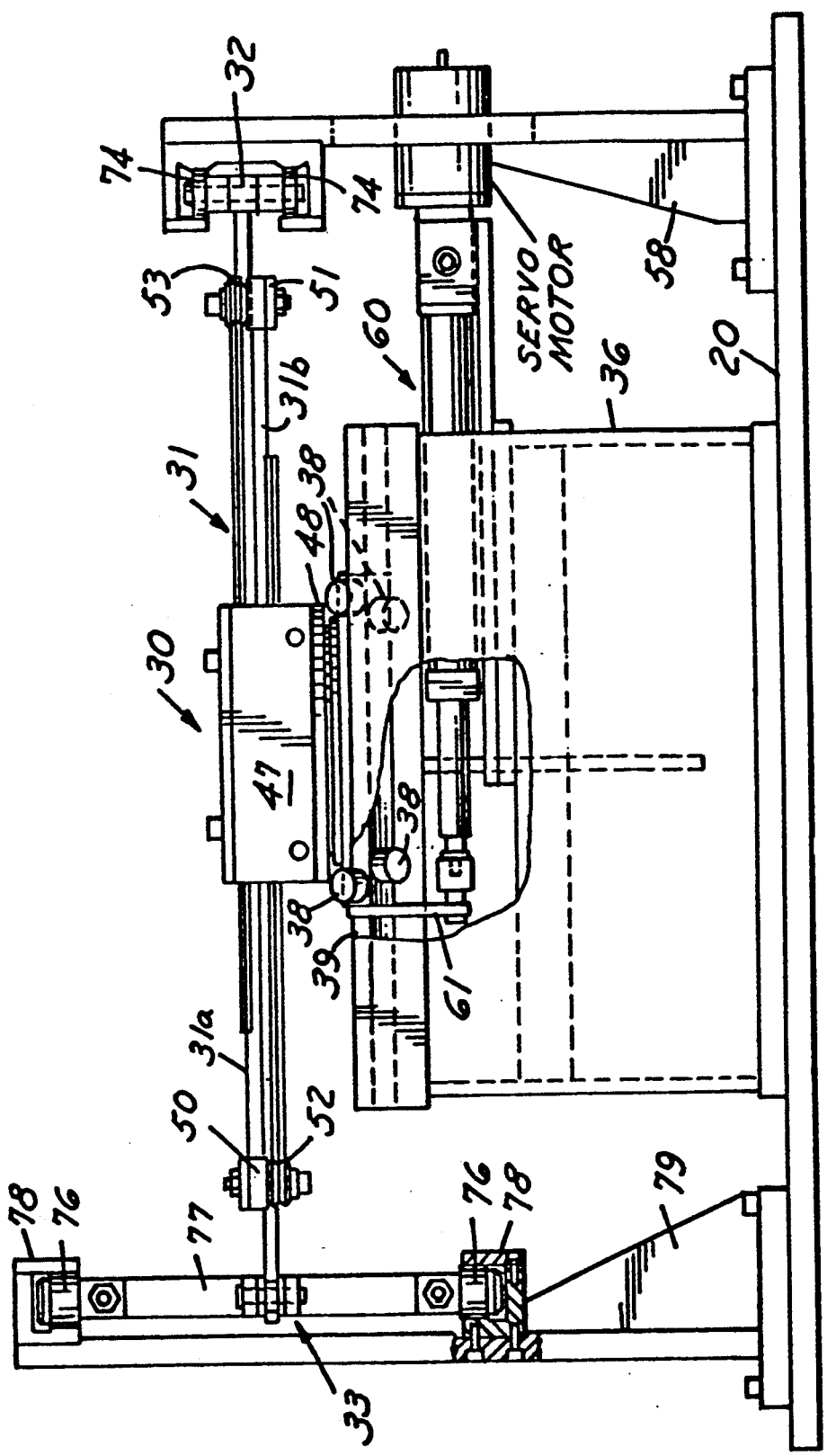
FIG. 2 is a end view taken from the right in FIG. 1.

Referring to FIGS. 1 and 2, the cut-off machine embodying the invention is adapted to receive a continuous moving length of material such as roll form material like tubing from a source such as a tube mill and simultaneously cut off a plurality of lengths from the moving length as the tubing is moving away from the tube mill. The machine comprises a base 20 and uprights 21,22 on the base 20 which support a plurality of tube cut-off assemblies 23, herein shown as two, which are reciprocated longitudinally and are moved simultaneously in synchronism with the tube. Each cut-off assembly 23 include a knife blade that is rotated to cut off a length of tube from the tubing, as presently described. The drive is derived from a servo motor 65 which drives a gear and crank assembly 25 mounted on base 20 which, in turn, reciprocates the cut-off assemblies 23 and rotates the cutting knives of the cut-off assemblies 23, as presently described.

Each cut off assembly 23 is preferably of the type shown in the aforementioned U.S. Pat. No. 4,939,967 and application Ser. No. 07/462,049 incorporated herein by reference. Each tube cut-off assembly 23 includes a body fixed on dual shaft 24 which is mounted on the uprights 21,22 for longitudinal reciprocation in linear bushings. Each body is also supported for longitudinal reciprocating movement relative to a spline shaft 25 extending longitudinally between the uprights 21, 22.

Spline shaft 25 extends through bushings such that the shaft 25 can rotate as well as support each body cut off assembly 23 for relative longitudinal movement. One body is maintained at a predetermined distance with respect to the other body corresponding to the length of the tubing to be cut by the respective knives by a threaded shaft rotatably mounted in the body and threaded into a unit 23.

As shown in the aforementioned application Ser. No. 07/462,049, the position of one tube cut-off assembly relative to the other can be adjusted by a threaded shaft. This is achieved by an extension in the form of spline shaft connected to the end of threaded shaft by a coupling and extending through a ball spline bearing on upright 22. A hand crank drives a right angle box having a gear that meshes with a gear which, in turn, meshes with a gear on the shaft to translate one cut off assembly along shaft and thereby adjust the distance between cut off blades on the cutter assemblies. A servo motor may be provided to form a power drive.

In accordance with the invention, the drive for reciprocating the cut off assemblies 23 comprises a differential beam pivot assembly 30 which includes a differential beam 31 that is extensible along its length and has one end 32 pivoted to a reciprocating connector 33 driven by a servo motor crank drive assembly 34. The other end 35 of the beam 31 is pivoted by a connector 35 to the shaft 24 on which the cutter assemblies 23 are fixed.

Figure 3:
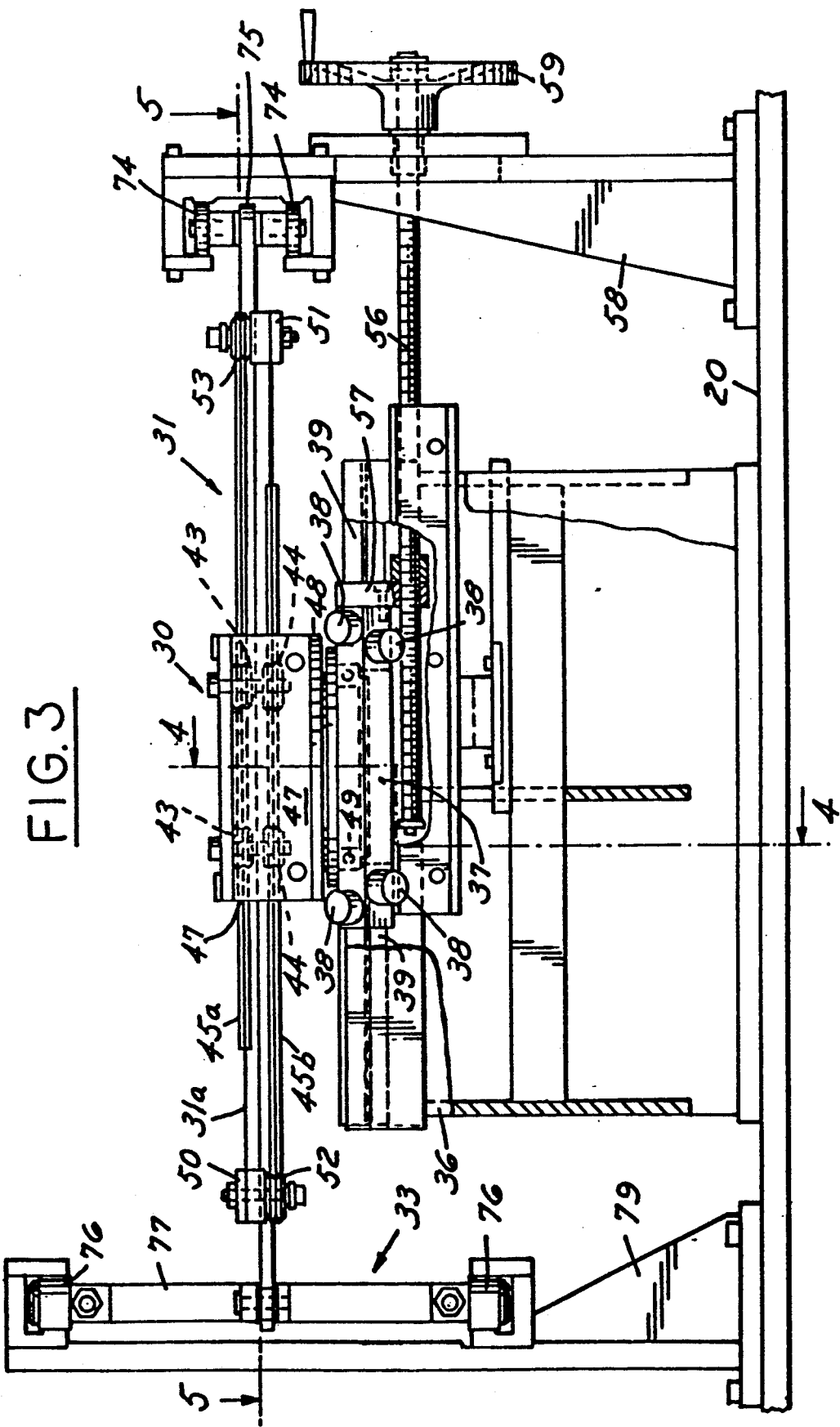
FIG. 3 is a view similar to FIG. 2 showing a manually adjustable mechanism.
Figure 4:
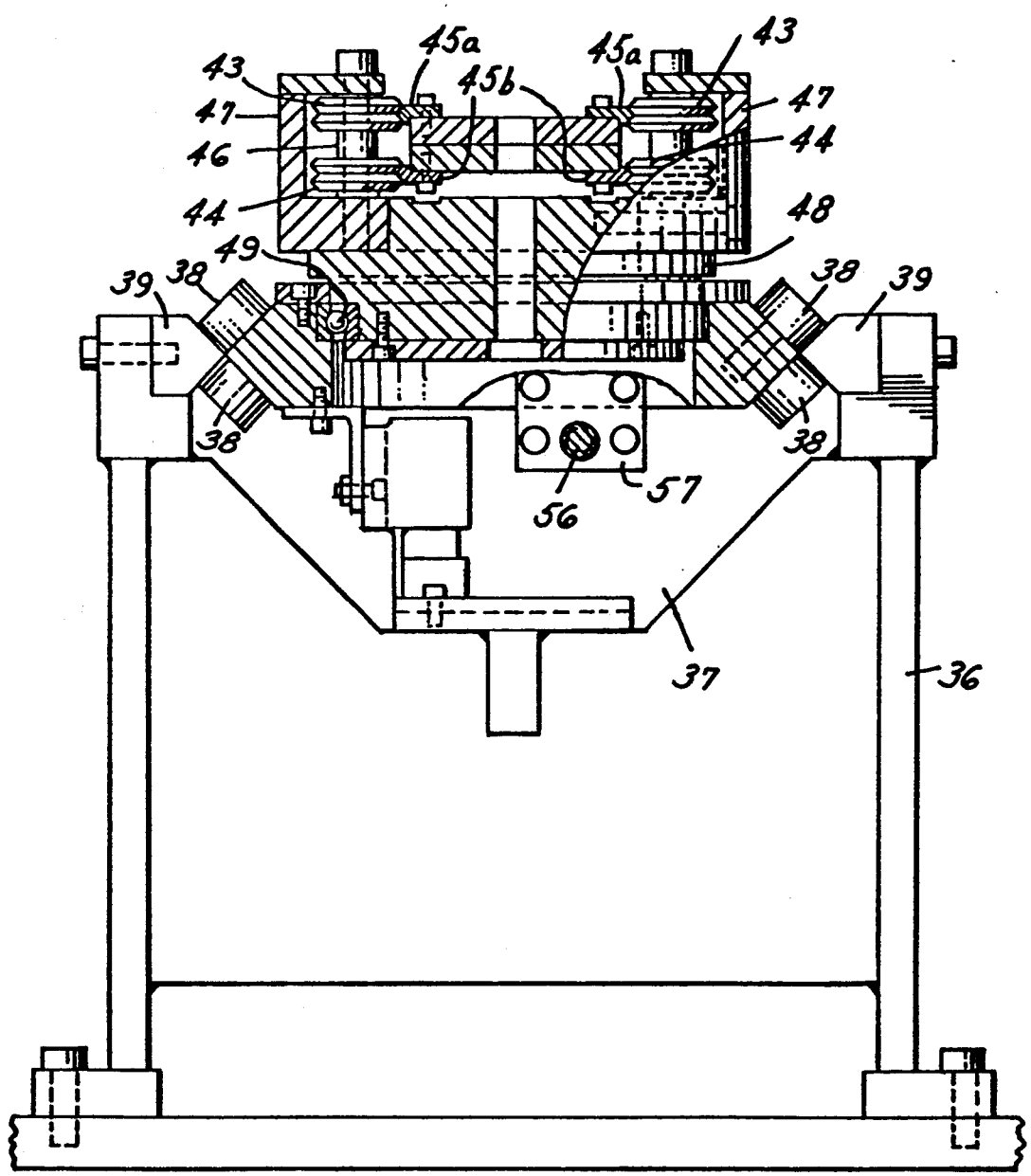
FIG. 4 is a sectional view taken along the line 4—4 in FIG. 3.
Figure 5:
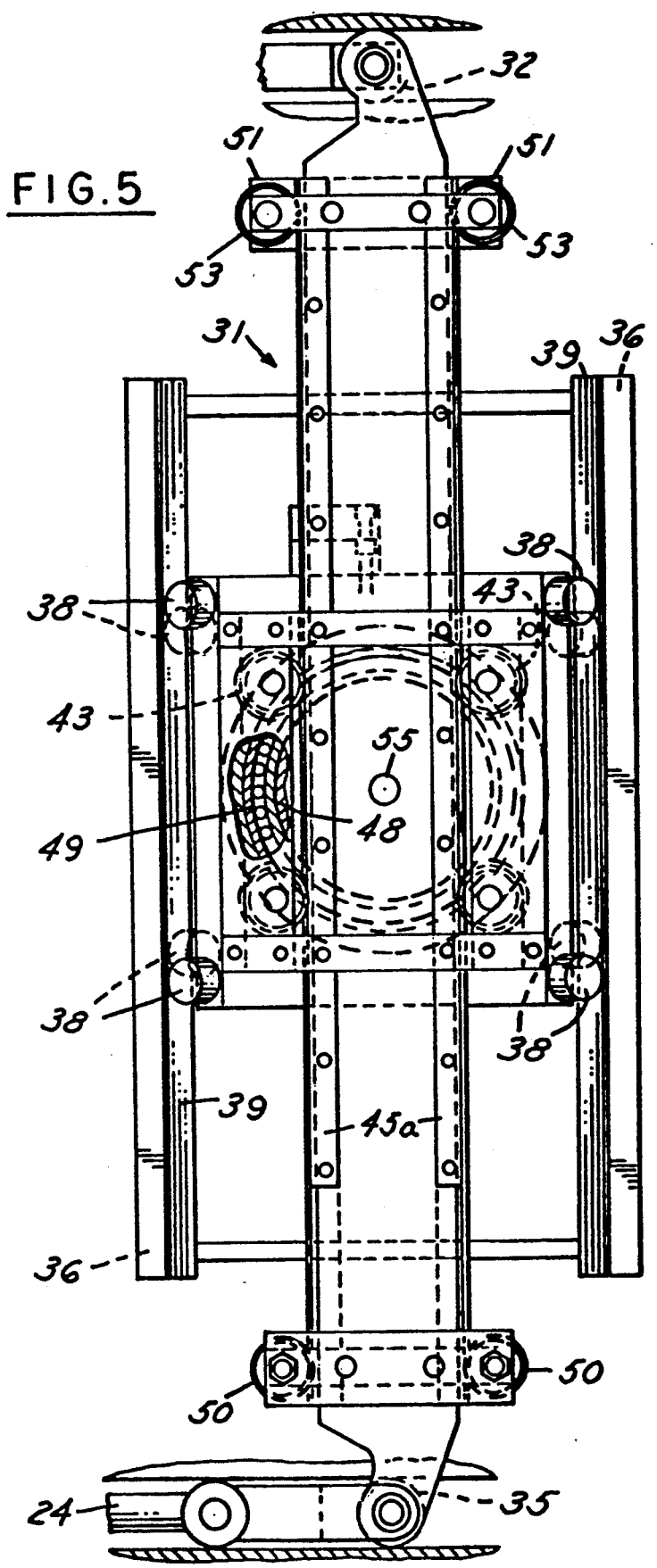
FIG. 5 is a fragmentary part sectional plan view on an enlarged scale taken along the line 5—5 in FIG. 3.

Referring to FIGS. 3-5, the differential beam pivot assembly 30 comprises a base 36 on which a slide 37 is mounted for horizontal movement by angled rollers 38 on the slide 37 engaging spaced V-shaped tracks 39.

Referring to FIGS. 1-5, differential beam 31 comprises an upper beam portion 31a and a lower beam portion 31b which are slidable longitudinally of one another on spaced sets of upper V-shaped rollers 43 and lower V-shaped rollers 44 which are engaged by V-shaped guides 45a, 45b on the beam portions 31a, 31b. Each set of rollers 43, 44 is rotatably mounted on a vertical shaft 46 on brackets 47 mounted on a pivot carriage 48 mounted for rotation on the slide 37. Vertical ball bearings 49 facilitate rotation of carriage 48 relative to slide 37.

A bracket 50, 51 on one end of each of the beam portions 31a, 31b supports a V-shaped guide roller 52, 53 engaging the V-shaped guides 45b, 45a to assist in guiding the slide portions 31a, 31b. (FIGS. 2 and 3).

The differential beam 31 is thus mounted to the carriage 48 which is pivoted to slide 37. The position of pivot carriage 48 and, in turn, the position of the pivot point of the beam 31 can be adjusted relative to the slide 37 by means comprising a screw 56 threaded at one end to a bracket 57 on the slide 37 and at the other end on an upright 58 so that it can be rotated by a hand wheel 59 (FIG. 3). Alternatively, a servo driven linear actuator 60 has its actuating rod connected to a bracket 61 and its stationary end connected to the base 36 (FIG. 2).

Figure 8:
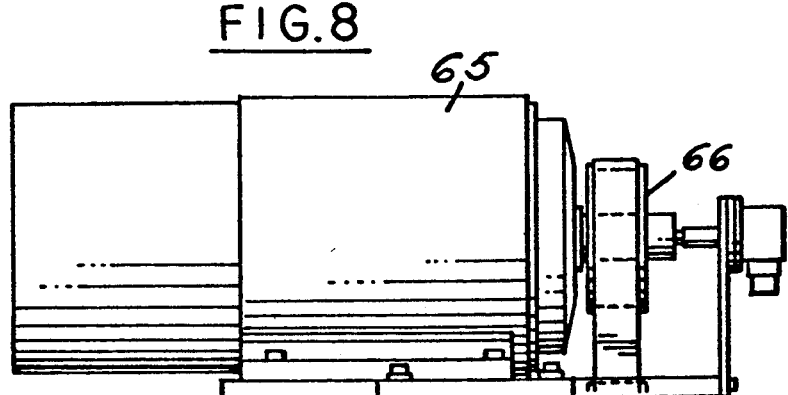
FIG. 8 is a sectional view taken along the line 8—8 in FIG. 6.

Referring to FIGS. 6-8, the servo motor crank drive assembly 34 comprises a servo motor 65 that drives a sprocket 66 which, in turn, drives a sprocket 67 through a toothed belt 68. The sprocket 67 is fixed on the shaft that drives a crank 69. The crank 69 has a roller 70 thereon engaging a slot track 71 extending transversely on an actuator slide 72 guided by spaced rollers 73.

Continuous rotation of crank 69 reciprocates actuator slide 72 and, in turn, reciprocates the end 32 of the differential beam 31. This associates the beam 31 about its pivot providing a predetermined stroke on the other end 33 of the differential slide 31. The movement of the end 32 in a straight line is guided by spaced rollers 74 which engage a fixed track 75 on the upright 58 (FIG. 2). The movement of the end 33 is in a straight line is guided by rollers 76 on a support 77, the rollers 76 engaging a fixed track 78 on an upright 79.

Figure 11:
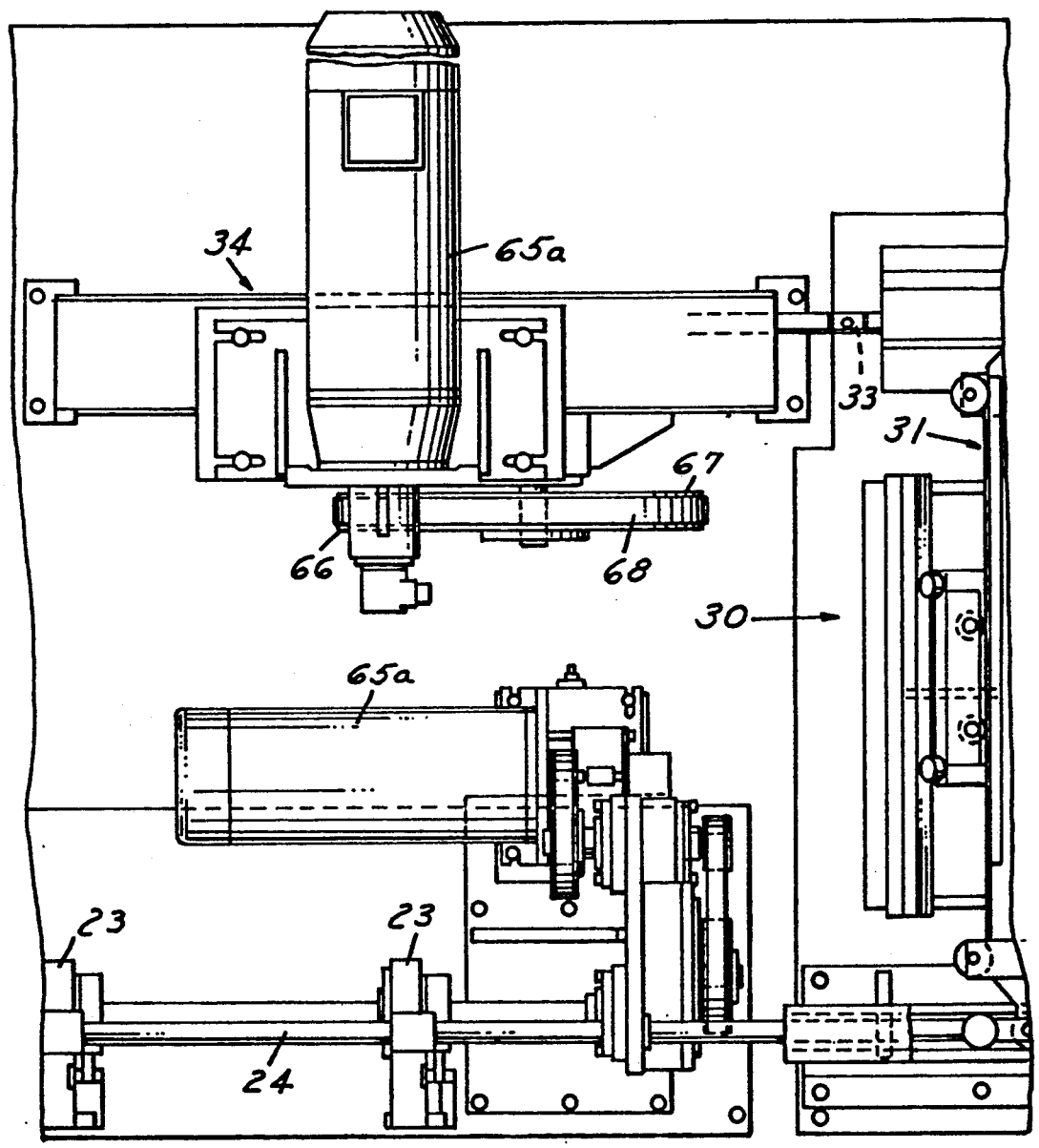
FIG. 11 is a fragmentary plan view of a modified form of apparatus.

The servo motor 65 also drives the rotation of the spline shaft 25 which rotates the cutters of the cut off assemblies 23. Alternatively, a separate servo motor 65a may be used as shown in FIG. 11. During the drive to the differential slide 31, the beam portions 31a, 31b move longitudinally relative to one another so that the input end 32 and output ends travel parallel paths.

The servo system must provide one revolution of the crank per cut off cycle.

Figure 12:
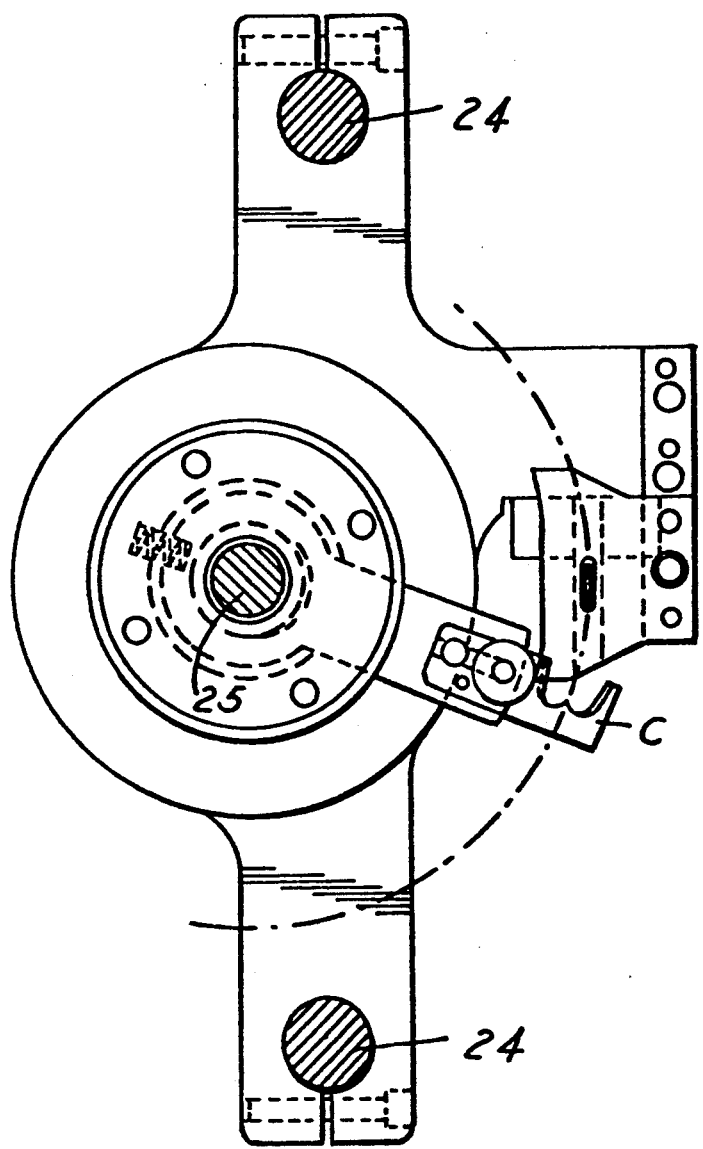
FIG. 12 is a sectional view of a typical tube cut-off assembly.

The cut off blade C must pass through the tube during the time the crank pin passes through a predetermined window, for example, a 30° window as shown in FIG. 12. During this time, the speed of the tube and the longitudinal motion of the cut off assemblies must be synchronized via the differential pivot.

Pivot carriage 48 thus allows the center of the rocker action of beam 31 to be precisely adjusted providing a means to increase and decrease the slide travel at the output end 33 of the beam 31 to provide synchronizing the speed of the cut off assemblies with the tube speed during the time when the crank 69 passes through the predetermined cut off window, this may be contrasted to the continuous electronic servo control required in the aforementioned which provides motor R.P.M. increases and decreases during each cut off cycle.

Pivot carriage thus allows the center of the rocker action to be precisely adjusted providing a means to increase and decrease the slide travel at the output end of the beam to synchronize the speed of the cut off assemblies with the tube speed during the time when the crank passes through the 30° cut off window.

EXAMPLE

Figure 9:
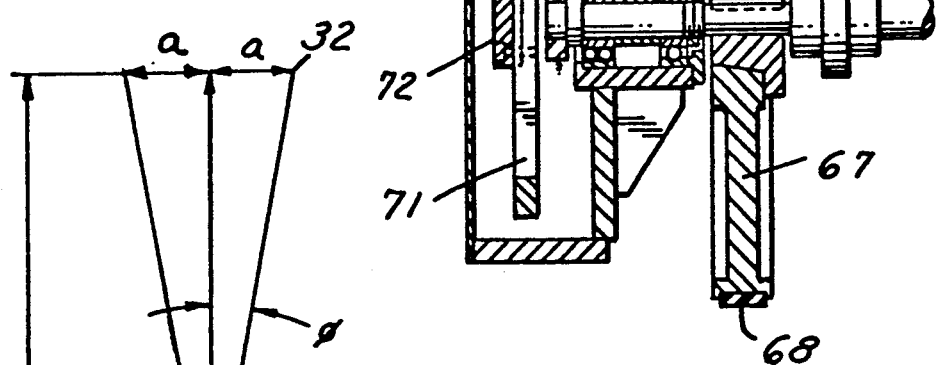
FIG. 9 is a diagram of the function of the differential beam mechanism utilized to control the movement of the tube cut-off assemblies.
Figure 9A:
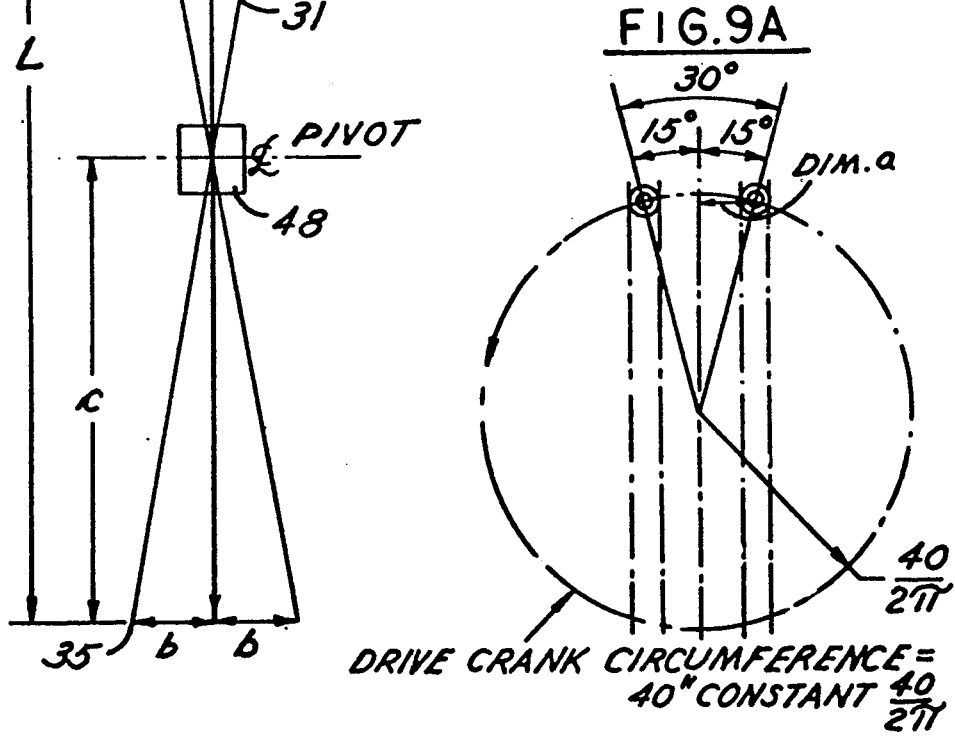
FIG. 9A is a diagram of the crank rotor.

Referring to FIG. 9A, for example, the center of the pivot of crank inscribes the circumference of a circle exactly 40" around. Therefore, if a tube 40 inches long is to be produced and the differential pivot is set at the exact center of pivot, the cut-off shuttle motion would equal the tube speed only at the instant the crank pin center is at the vertical centerline of the inscribed circle.

During the 30° of the arc window desired for travel of the cutter through the tube, the crank pin arc length is 3.333". However, the straight line travel of the cross head equals 3.295" or 0.038" shorter than the distance traveled by the tube which can cause the tube to compress during cut off and cause excess variance in tube cut length.

This differential pivot center can thus be set to correct the arc error and increase or decrease the output shuttle travel to suit any length of tube within the designed capacity of the cut off machine assembly.

The formula for calculating the pivot point position for various lengths of cut tubes is shown below. Where:

L=length of tube to be cut-off per cycle
40=space between uprights 58, 79 at centerline of guide tracks.

$$a = \frac{L}{2\pi} \times \sine 15°$$

$$b = \frac{L}{360°} \times 15$$

$$\tan\phi = \frac{a+b}{40}$$

$$c = \frac{b}{\tan\phi} = \frac{b}{(a+b) \div 40}$$

FIG. 10 represents a plurality of diagrams indicating how the pivot of the differential slide must be changed to adjust for various lengths of tubing.

It can thus be seen that there has been provided an apparatus which mechanically (1) converts the movement of a crank motion to a constant speed (2) matches the speed of longitudinal movement of the cut-off assemblies and the speed of travel of the tubing to be cut during a predetermined angle of movement of the cutter in each cut-off cycle and (3) which can be adjusted to cut tubes of various lengths.

Figure 13:
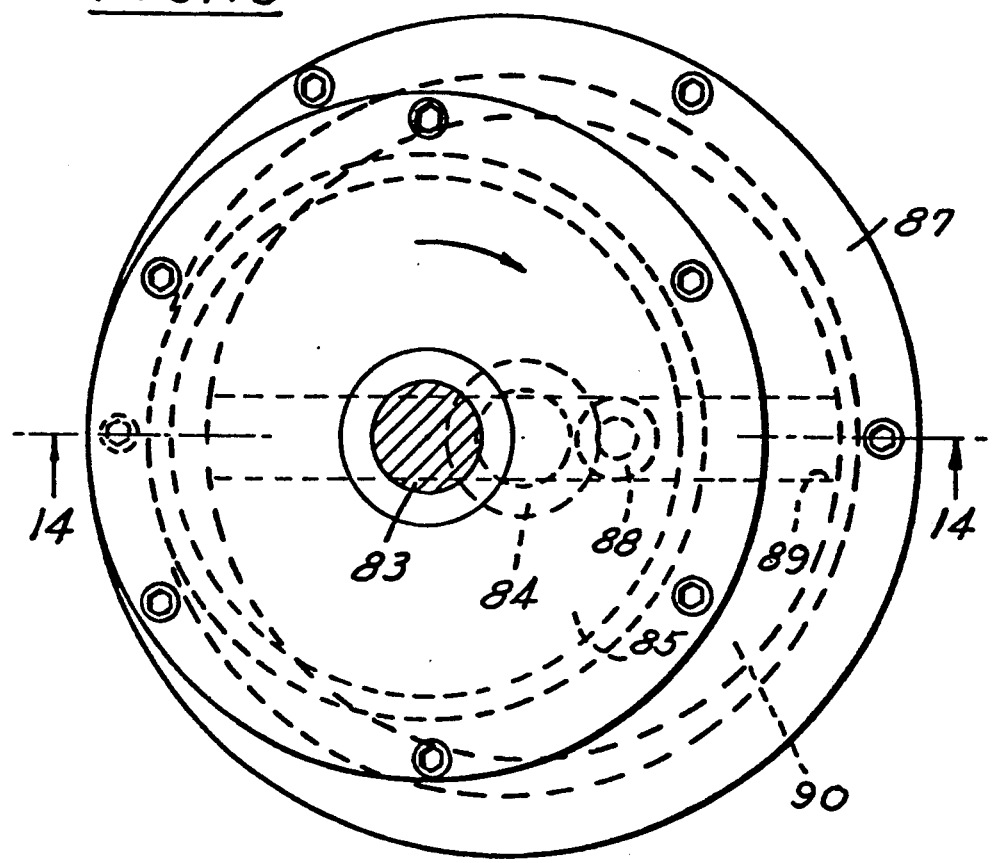
FIG. 13 is a sectional view on an enlarged scale along the line 13—13 in FIG. 1.
Figure 14:
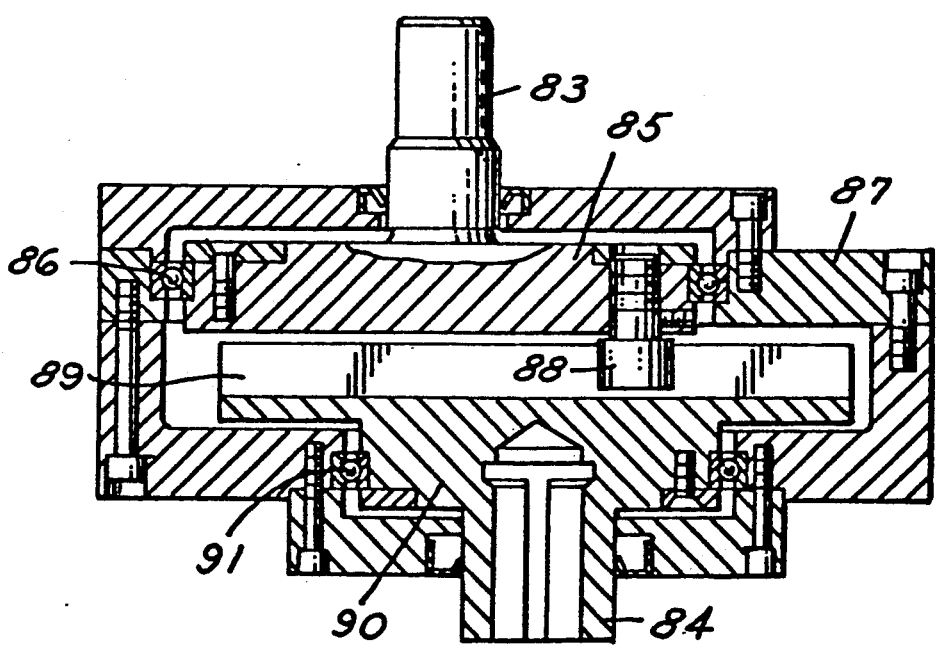
FIG. 14 is a sectional view taken along the line 14—14 in FIG. 13.

In another aspect of the invention, it has been found that where the tubing to be cut has a large dimension in the direction of travel of the cutter blade there may be insufficient time for the cut resulting in an angled cut rather than a perpendicular cut. Thus, the invention includes an accelerator mechanism 80 interposed between the shaft 81 driven by motor 65 and the gear box 82 which drives the rotary motion of the shaft 25 that rotates the cutters C. As shown in FIGS. 13 and 14, accelerator mechanism 80 comprises an input shaft 83 which is complied to shaft 81 and an output shaft 84 which is coupled to the input of gear box 82. Shaft 83 is fixed on a drive plate 85 rotatably mounted by a bearing 86 in the housing 87. The plate 85 supports a follower 88 that engages a diametrical track 89 on a driven plat 90 rotatably mounted in housing 87 by a bearing 91. Thus, input shaft 83 and output shaft 84 are eccentrically mounted relative to one another.

As shaft 81 rotates input shaft 83, the follower 88 rotates the output shaft such that a momentary acceleration of the rotation of the cutter C (FIG. 12) occurs during the predetermined window, insuring that the cutter will cut a large tube, such as a large flattened tube perpendicular to the length.

Figure 15:
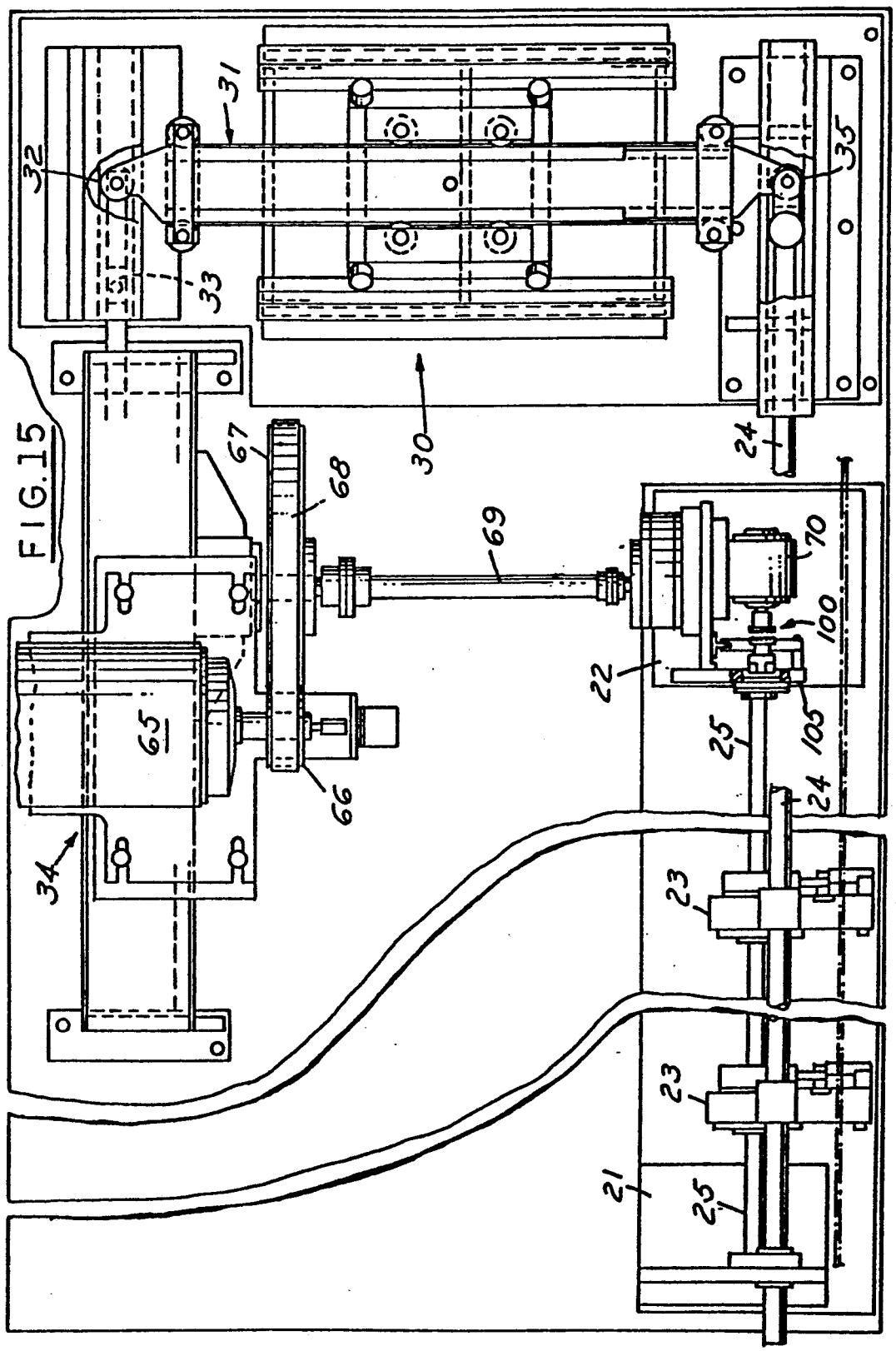
FIG. 15 is a fragmentary plan view of a modified form of cut-off machine.
Figure 16:
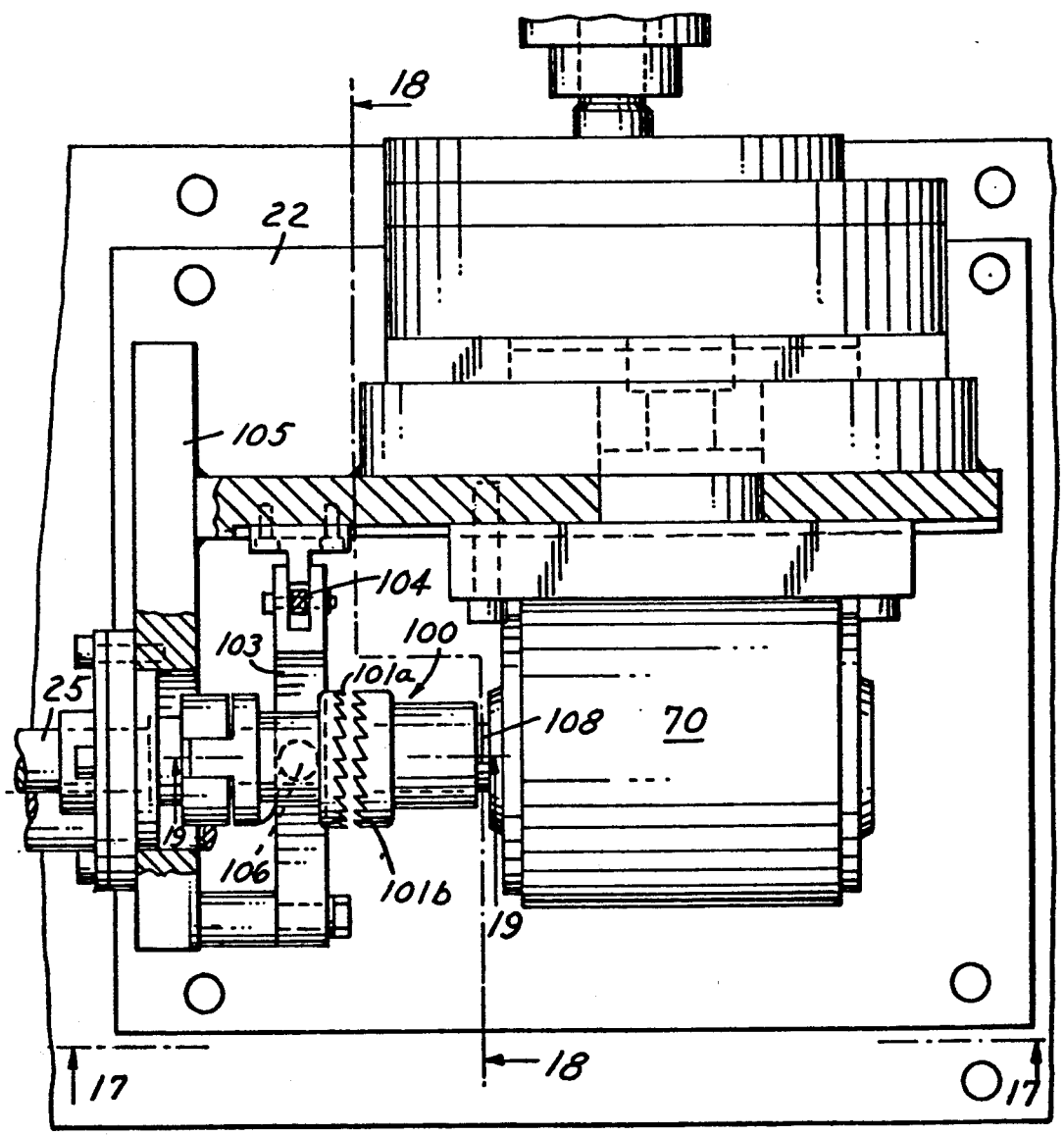
FIG. 16 is an enlarged fragmentary view of an enlarged scale of a portion of the apparatus shown in FIG. 15.
Figure 17:
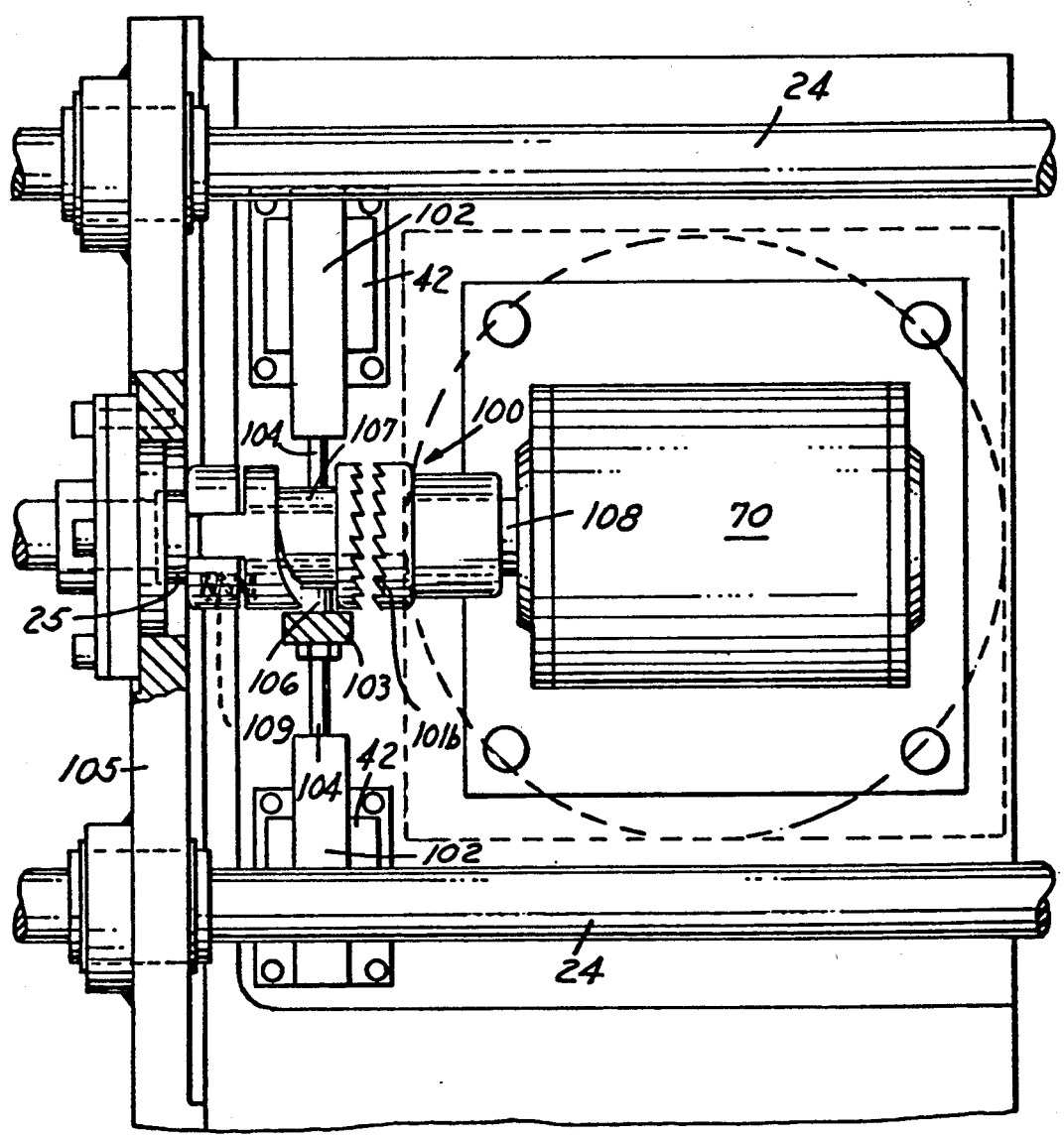
FIG. 17 is a sectional view taken along the line 17—17 in FIG. 16.
Figure 18:
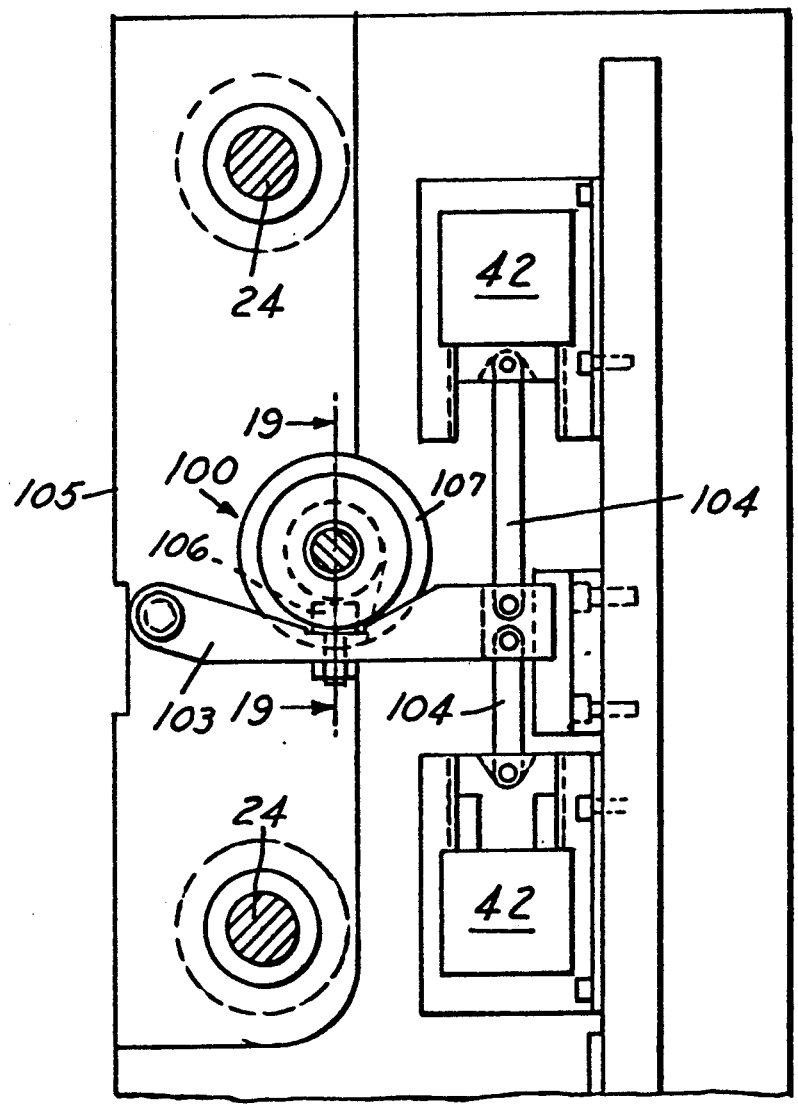
FIG. 18 is a sectional view taken along the line 18—18 in FIG. 16.
Figure 19:
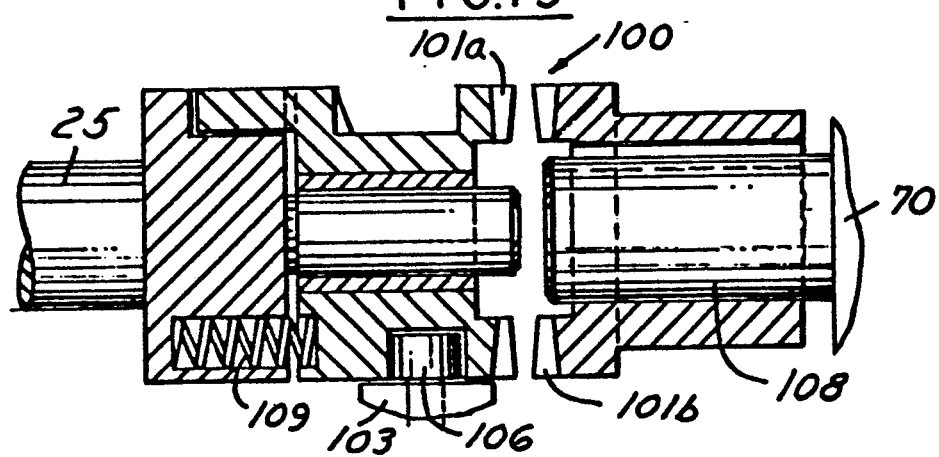
FIG. 19 is a fragmentary sectional view taken along the line 19—19 in FIG. 18.
Figure 20:
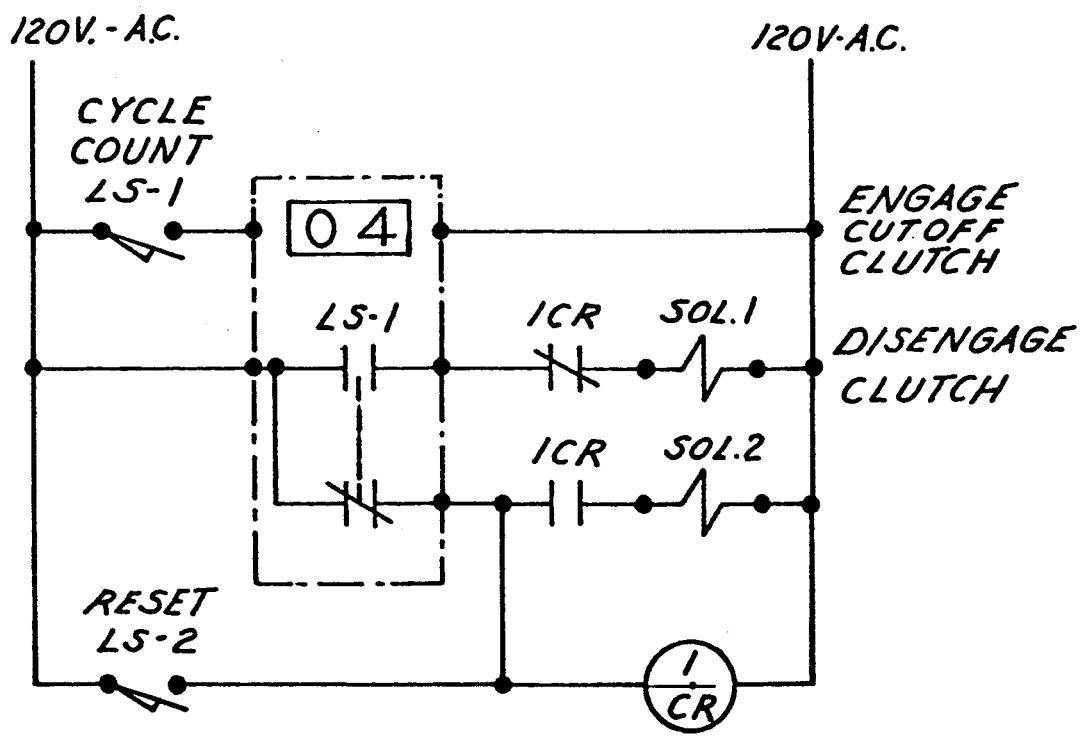
FIG. 20 is a schematic circuit for control of the apparatus shown in FIGS. 15-19.

In accordance with another aspect of the invention shown in FIG. 15, between the gear box 70 and the shaft 25 there is provided a mechanism 100 which is selectively operated so that the rotation of the shaft 25 may be driven in a first mode wherein the cutter is rotated once every cycle or in a second mode wherein the cutter is only driven periodically after a predetermined number of rotations in the gear box 70. In this fashion, it is possible to feed a greater length of tubing before the tubes are cut off.

Referring to FIGS. 15-19, the mechanism 100 comprises a periodically driven clutch 101 that is under the control of a pair of push pull solenoids 102 which are alternatively energized to control the position of an arm 103 through links 104. Arm 103 is pivoted to an frame 105 and supporting a cam follower 106. The cam follower 106 engages a groove 107 such as to position the teeth of clutch member 101a into or out of engagement with the teeth 101b on the drive shaft 108. The groove 107 is provided on a member that supports the teeth 101a and is yieldingly urged axially by a coil spring 109.

When it is desired to cut off tubes of greater length, the solenoids 102 are activated periodically after a predetermined number of cycles of rotation of the shaft output from the gear box so that a number of reciprocations of the cut-off assemblies occur before the cutters of the cut-off assemblies are actuated. If it is desired to cut off shorter tubes, which can be accommodated by the reciprocation in each cycle, the solenoid is continuously energized.

Thus, the present invention provides a random length cut-off of tubing which is longer than the maximum length of tube which can be cut in a single cut-off cycle of the machine.

In normal operation, cutting off tubes up to a maximum dimension, for example, 60" long, the clutch is constantly engaged and the cut-off cutter operates every machine oscillation cycle.

Longer tubes require multiple oscillation cycles before the tube is cut off.

EXAMPLE

Assuming an 80" tube is desired:
1) The differential pivot would be set for a 40" long tube.
2) Two oscillation cycles would be required to produce the 80" tube.
3) The clutch would be normally disengaged and would be engaged to turn the cut-off shaft every second cycle for a single revolution.
4) A 120" tube would require three cycles per cut-off. The clutch would be engaged every third cycle for a single revolution.

It is necessary to trip a limit switch or a proximity switch at a proper position in the cycle which wold trip a cycle counter.

The cycle counter must be able to close a switch at a predetermined count to signal the solenoids to release the clutch for single cycle and automatically reset the counter.

A partial revolution of the cutter shaft will trip a proximity switch which will deenergize the trip solenoid and reenergize the clutch and disengage the solenoid.

In normal operation, the above described electric circuits would be deenergized allowing the clutch to be closed for continuous operation.

I claim:

1. A cut-off machine for cutting off predetermined lengths from a moving length of roll form material such as tubing adapted to be positioned downstream from a source such as a tube mill for receiving a moving length from the mill which is moving at a predetermined speed and severing plural predetermined lengths from the moving length comprising, a cut-off assembly which is reciprocated longitudinally of the moving length of material formed by the mill and operated during the movements, to sever a predetermined length, drive means for reciprocating said cut-off assembly, said cut-off assembly including a knife blade movable about an axis of rotation and movable radially inwardly of the axis of rotation as it intersects the path of the tube to be cut, cutter drive means for rotating the knife blade on said cut-off assembly in an endless path and cutting said tubing during a predetermined angle of movement of said knife blade, said drive means for reciprocating said cut-off assembly comprising a servo motor, a crank driven by said servo motor, an actuator slide including a slot track, said crank engaging said slot, and a differential beam, said differential beam comprising an upper beam and a lower beam, means for guiding said beams for relative longitudinal movement, means for pivoting said upper and lower beams for simultaneous movement about a pivot axis, means for pivotally connecting one of said beams to said actuator slide movement and means for pivoting the other said beam for linear movement to said cut-off assembly.

2. The apparatus set forth in claim 1 including means for changing the pivot axis of said differential beam to adjust the pivot axis to cut tubes of different lengths by moving the pivot point of the differential beam.

3. The apparatus set forth in claim 2 wherein said means for pivoting said beam comprises a rotatable carriage on which said beam is mounted.

4. The apparatus set forth in claim 3 including means for reciprocating said carriage to change the pivot of said carriage to accommodate cutting of tubing of different lengths.

5. The apparatus set forth in claim 4 wherein said means for reciprocating said carriage comprises a slide on which said carriage is mounted, a slide track on which said slide is mounted and means for adjusting said slide relative to said slide track.

6. The apparatus set forth in any one of claims 1-5 including drive mechanism for mechanically momentarily accelerating the rotation of said knife blade to cause the knife blade to move through said predetermined angle at a greater speed such that the knife blade can cut tubing of greater transverse width in the same time interval.

7. The apparatus set forth in claim 6 wherein said drive mechanism for rotating said cutters being such that it can be selectively operated to rotate the cutters in a first mode wherein the cutters are actuated only after a predetermined number of reciprocating cycles of the cut-off assemblies or a second mode wherein the cutters are operated on each cycle of reciprocating motion of the cut-off assemblies.

8. The apparatus set forth in claim 7 including electrical cycle control means for counting the number of cycles and actuating said cutters after a predetermined number of cycles.

9. The apparatus set forth in any one of claim 1-2 including a plurality of said cut-off assemblies mounted for simultaneous reciprocating movement for simultaneously cutting of a plurality of lengths of tubing.

* * * * *